United States Patent [19]

Magnusson et al.

[11] 4,378,755

[45] Apr. 5, 1983

[54] DE-ICING AND CLEANING SYSTEM FOR AIRCRAFTS

[76] Inventors: Ulla M. Magnusson; Kjell-Eric Magnusson, both of Forstenavägen 3A, S-161 35 Bromma, Sweden

[21] Appl. No.: 173,135

[22] PCT Filed: Nov. 8, 1978

[86] PCT No.: PCT/SE78/00071

§ 371 Date: Jul. 25, 1979

§ 102(e) Date: Jul. 25, 1979

[87] PCT Pub. No.: WO79/00331

PCT Pub. Date: Jun. 14, 1979

[30] Foreign Application Priority Data

Jan. 12, 1977 [SE] Sweden .............................. 7713619

[51] Int. Cl.³ .............................................. B05C 5/00
[52] U.S. Cl. .................................... 118/684; 118/697; 118/314; 118/316; 118/73; 134/57 R; 134/123
[58] Field of Search ...................... 134/45, 57 R, 123; 15/53 A; 118/679, 73, 682, 58, 683, 684, 685, 323, 305, 314, 313, 316, 697, 698

[56] References Cited

U.S. PATENT DOCUMENTS

| | | | |
|---|---|---|---|
| 2,984,438 | 5/1961 | Arnold | 244/110 |
| 3,013,445 | 12/1961 | Enssle | 118/679 X |
| 3,255,037 | 6/1966 | Knight et al. | 118/697 X |
| 3,373,752 | 3/1968 | Inoue | 134/1 |
| 3,378,018 | 4/1968 | Lawter | 134/109 |
| 3,391,700 | 7/1968 | Lawter | 134/45 |
| 3,409,030 | 11/1968 | Schmidt | 134/123 |
| 3,529,572 | 9/1970 | Rose | 118/697 X |
| 3,533,395 | 10/1970 | Yaste | 134/45 X |
| 3,537,423 | 11/1970 | Burden | 118/73 X |
| 3,601,832 | 8/1971 | Cook | 15/21 E |
| 3,612,075 | 10/1971 | Cook | 134/123 X |
| 3,835,498 | 9/1974 | Arato | 15/53 A |

OTHER PUBLICATIONS

Automatic Station KRAMS, Edited by L. P. Afinogenvc and N. S. Sterngat, Publishing House Gidrometeorzdat, Leningrad 1974, pp. 29-30.
G. H. Stremel, Load-Lifting Machines, Moscow, 1963, p. 10.

*Primary Examiner*—John P. McIntosh
*Attorney, Agent, or Firm*—Oblon, Fisher, Spivak, McClelland & Maier

[57] ABSTRACT

An apparatus for rapid, efficient and safe de-icing and cleaning of primarily aircrafts. A de-icing and cleaning system, includes one or more devices for spraying the object in question, preferably aircrafts, with a liquid or gas or irradiating the object, and includes a mechanism for sensing the position of the object relative the devices, and is disposed for controlling the devices to automatically start and stop the spraying and irradiation in response to the position of the aircraft relative the devices.

14 Claims, 4 Drawing Figures

DE-ICING AND CLEANING SYSTEM FOR AIRCRAFTS

BACKGROUND OF THE INVENTION

1. Field of the Invention

The factors defining the aerodynamic characteristics of an aircraft is on one hand the geometry of the supporting surfaces and on the other hand the surface smoothness of the supporting surfaces. Rough surfaces may deteriorate the flying performance to a considerable degree. Ice and snow coatings may cause so rough surfaces that flying is rendered impossible. During flight the built-in de-icing system of the aircraft is sufficient but at ground intervals de-icing must be performed before start under unfavourable meteorological conditions.

2. Description of the Prior Art

In certain cases it might be sufficient to sweep the wings clear of loose snow but more efficient actions are most often required. In general a hot mixture of water and glycol is sprayed, whereby the glycol provides a certain preventive effect, which is intended to remain, until the aircraft has climbed into the air. Upon heavy snow fall the treatment must be performed immediately before start.

The spraying of the de-icing liquid is generally performed by a team consisting of a spraying machine operator and a driver, who drives the tank truck with the spraying machine. The spraying machine operator stands on a lifting platform, from which he treats those portions of the aircraft which can be reached by the jet from the spraying machine. The truck is driven around the aircraft so that all portions of the aircraft can be treated.

Under favourable conditions the aircraft is occupied for only about five minutes by the treatment but time studies have shown that on the average a team will work 45 minutes on each aircraft. It is not rare that delays of air services occur because many planes are queueing to be de-iced. Thus, de-icing will frequently cause a bottle-neck in the traffic capacity of the air port.

The method has been criticized, since excess glycol may penetrate into the ground and in the long run ruin the ground water.

In order to reduce these risks special locations have been arranged at the new air ports of Paris and Montreal, where de-icing is to be performed. Through drainage systems the treatment liquid can be recovered and re-used. De-icing is performed by the aircraft by its own engines passing between two large scaffolds, on which 4 to 6 men are placed. By means of hand-operated jet nozzles the men spray the aircraft as it passes.

In Sweden the authorities have developed an interest in the health risks of the method for the staff involved. Stricter safety directives have been issued.

In U.S. Pat. No. 3,612,075 a central de-icing installation is disclosed consisting of a pair of in the longitudinal direction of the aircraft self-propelled towers on either side of the air-craft. Each tower is provided with a hinged boom, which extends inwardly over the aircraft. By means of a plurality of hinges the boom is pivotable in the vertical plane. The boom carries a conduit with nozzles for spraying de-icing liquid or compressed air. The installation is intended to operate so that the towers are driven in pairs externally of the wing tips along the parked aircraft. The inwardly projecting booms and their hinges are actuated so that the nozzles of the conduit are located adjacent and directed towards the surfaces to be de-iced. The purpose appears to have been to solve the problem of rapidly spraying the necessary surfaces of the aircraft.

The German Offenlegunsschrift No. 2,343,389 discloses an installation for recovering and re-using de-icing liquid and arrangements for spraying de-icing liquid.

In a system of ducts on the parking ramp the de-icing liquid run off from the aircraft, is then collected and conducted in pipes to a purification plant. After having been analyzed with respect to dilution the liquid can either be rejected (should the glycol content be too low) or else be treated by freezing or distillation so that the concentration of glycol is increased. If required, fresh glycol is added to the solution, which is finally heated and stored in a storage tank, until it is to be used again. The inventor of this system appears to presume that a de-icing liquid should be used consisting of a solution of approximately equal parts of water and glycol.

For the spraying of the de-icing liquid it is indicated that two or four vehicles should be placed at strategic locations on the de-icing ramp. Each vehicle is provided with a two-part boom, which is moved inwardly towards the parked aircraft. The boom carries a conduit with a nozzle, through which the liquid is sprayed onto the aircraft.

SUMMARY OF THE INVENTION

The object of the present invention is to provide a more rapid, efficient and safe de-icing at a lower cost and without risks for the staff and the environment. It is discussed below how the present invention, in preferred embodiments thereof, will fulfil these requirements in comparison with other types of installations.

A more rapid de-icing is attained by having the aircraft pass through a stationary de-icing installation, all surfaces of the aircraft being treated as they pass a spraying device. Without time delay downwardly and laterally directed surfaces are de-iced. The treatment time will be a function of the velocity of the aircraft through the installation and will depend only on the fact that the aircraft must spend sufficient time to be sprayed with the required amount of treatment liquid. The dimensions of nozzles, valves, pumps, etc. included in the spraying device will thus determine the treatment time. The costs for sufficient dimensions of these standard articles are trivial in this connection and will hardly form any restricting factor. If it is assumed that the aircraft is driven through the plant or installation at a velocity of 6 km/h (fast walking speed) the treatment time will be 42 sec. for an aircraft with a length of 70 m.

In plants according to U.S. Pat. No. 3,612,075 the treatment time will be equal to the maximum time required, for either moving the arrangement along the length of the aircraft, or for the operator to actuate all booms and valves. To be capable of treating the largest commercial airplanes of today the two interconnected towers must have a distance of about 65 m between their support points on the ground and a free internal height of about 21 m. Since the structure also must carry storage tanks for the treatment liquid, driving engines, pumps, cabins for the staff, a plurality of large, movable booms, etc., it is evident that it will be of such dimensions that it cannot reasonably be moved as rapid as an airplane is running. The installation comprises a plurality of booms, which are to be moved and pivoted in a vertical direction at the same time as scores of valves are to be opened and closed. It is hardly possible for one operator alone to manage to perform all these operations within a half minute or somewhat more, which are at disposition, if the plant is to be competitive.

In installations according to the German Offenlegunsschrift 2,343,389 a plurality of relatively conventional vehicles is used and the spraying is controlled manually. Consequently, the treatment time will depend on the amount of vehicles and staff to be used. Said patent specification hardly provides any improvement as compared with conventional methods in this respect.

A more effecient de-icing is provided according to the present invention, on one hand, by the automation of the spraying process and, on the other hand, by the separation of the remedying melting of snow and ice from the preventive spraying with glycol. The automation makes it possible for experts to define the absolutely most efficient treatment process in the form of a program and this process is then identically repeated at each treatment. The separation of remedying and preventive de-icing makes spraying of the airplane with concentrated glycol as the last treatment before start possible, concentrated glycol having a longer remaining preventive effect than the 50% glycol solution which is used at present and is supposed to be used according to the two cited patents.

Safety in flight will thus be increased both by the two features of the present invention as mentioned above and by the rapidity of the process, which removes any temptation in situations hard to judge to refrain from de-icing for avoiding delays.

The requirement of safer de-icing in this connection means that the process must not be dangerous to the aircraft and its cargo and that the operative reliability should be high.

The installation or system according to the invention will not introduce any new type of risks for the aircraft. If the portals are made sufficiently wide, there will hardly be any risk of collision. The reliability in operation of the spraying device will be high, since the number of movable parts is limited. The reliability of the apparatus recovering the treatment liquid will be high, since unmixed liquids are used, whereby simple and uncomplicated means can be utilized.

Plants according to the U.S. Pat. No. 3,612,075 are provided with a plurality of movable booms of substantial size, supported by a movable structure. Since de-icing is to be performed immediately before start, the aircraft will be fully tanked and fully loaded when it is de-iced. A malfunction or an incorrect operation of any one of the many movable parts may therefor have disastrous consequences. Further, a large number of movable parts have an unfavourable influence on the reliability in operation.

The German Offenlegungsschrift No. 2,343,389 discloses a recovery plant, the object of which is to analyze the treatment liquid which has run off and restore the glycol concentration to the values desired. All checking and control problems with the accompanying risks of interruption of the service caused thereby are avoided by the use of unmixed liquids, which is according to the present invention.

The total costs of de-icing can be separated into capital costs for the plant, operating costs in the form of staff costs, costs of material and other costs of operation and traffic costs for the aircraft treated.

The system according to the present invention affords lower total costs than both methods presently used and the systems according to the mentioned patent specifications for all airports, except possibly for such with the smallest traffic.

The system according to the invention, due to the stationary location and the simple design thereof, will be more economic to construct and maintain. The possibility of utilizing the plants also for the cleaning of aircrafts will distribute the fixed costs over several useful services. The automatization will reduce the staff costs to a minimum. The recovery of the treatment liquids will reduce both the consumption of liquids and the heating costs. The traffic costs for a treated aircraft can be assumed to be directly depending on the time during which the aircraft due to waiting or de-icing is prevented from performing useful traffic work. The great capacity of the system will keep these costs low. Finally, the improved safety in flight should be attached a considerable value, also in economic terms.

Risks of health for the staff are eliminated, on one hand, by the automatization rendering all staff unnecessary, possibly with the exception of a supervisor, and, on the other hand, by the possibility of placing the staff indoors. The risks for the external environment are reduced, since all treatment liquid is circulating within a closed system.

BRIEF DESCRIPTION OF THE DRAWINGS

An exemplary, preferred embodiment of the invention will be described below. The drawings include FIG. 1, which shows a frontal view of the system according to the invention.

DETAILED DESCRIPTION OF THE PREFERRED EMBODIMENT

Figure 1:
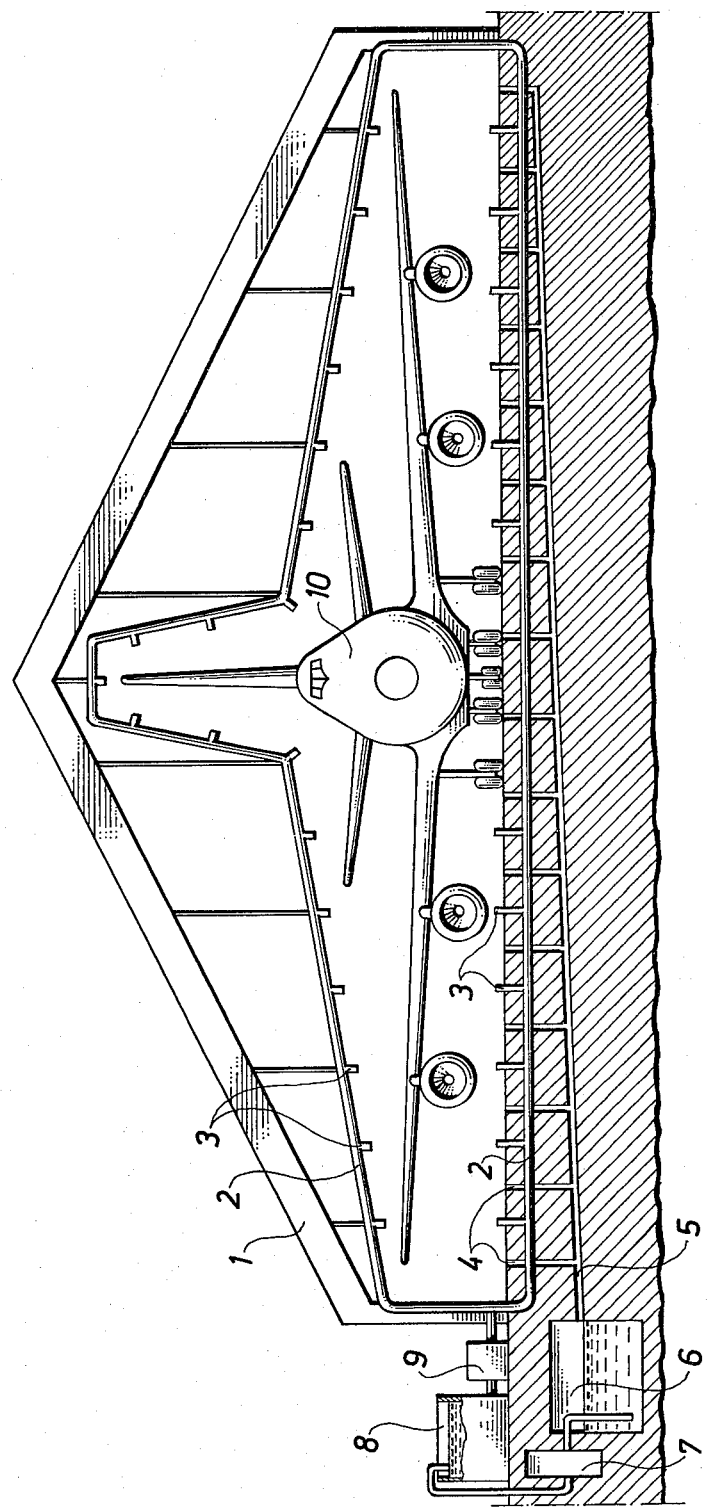

The aircraft to be de-iced is running through one or more stationary portals 1, see FIG. 1. Each portal supports a conduit 2, which is provided with a plurality of nozzles 3 directed towards the aircraft 10. Through the nozzles the treatment liquid is sprayed onto the aircraft. The spraying is individually controlled means of a remotely controlled valve for each nozzle.

If several different types of aircraft are to be treated, the conduit 2 which forms a substantially closed loop must be designed in such a manner that the largest aircraft 10 can pass unimpeded therethrough. If a small aircraft is treated the conduit in this case will be far away from the aircraft, which causes action of wind and cooling of the liquid jets to be considerable. In order to avoid this disadvantage, the portal 1 may support a plurality of different conduits, which are designed so that they closely conform with the profile of the aircraft as seen from the front. These conduits can be lifted in the portal. The conduit designed for the largest type of aircraft is fixedly mounted and when it is to be used, all other conduits are lifted thereover, so that they do not impede the passage of the aircraft. When a smaller aircraft is to be treated, the conduit designed therefor is lowered into operating position. Treatment liquid is sprayed only through those nozzles 3 that are mounted on the conduit used for the occasion.

At present it appears to be convenient to use two portals 1, one for the spraying with hot water and one for the spraying with non-diluted glycol. At the first portal all snow and ice is washed off by hot water. An abundant spraying will secure a good result without other disadvantages than increased heating costs for the water.

At the second portal 1 the aircraft 10 will receive a showering of concentrated glycol, which prevents coatings of snow and ice until the aircraft is airborne. A thrifty and accurately directed spraying is desirable in order to avoid a film of glycol on the windows and glycol in the engines and in air conditioning installations.

The system according to the invention may also be designed with only one portal 1, if it is to be used for the spraying of only one liquid or with three or more portals, if it is intended for spraying the aircraft with a corresponding number of different liquids.

The portals 1 are disposed over a roadway 11 for the aircraft 10 prepared for this puspose. The roadway is provided with a system of draining ducts 4, 5 for each portal. The draining ducts collect the liquid sprayed beside the aircraft or having run off the aircraft. The treatment liquid is conducted to a collecting tank 6 and therefrom to an installation 7 for purification and possibly heating or destillation, before it is pumped into a storage tank 8. From the storage tank the liquid is again pumped 9 into the conduit 2, when the next aircraft is treated.

The distance between the portals is determined by how long distance the wind can force the jets of liquid. The portals should be so far from each other that the different treatment liquids are not mixed on the ground. By using unmixed and non-diluted liquids and keeping them separated from each other the recovery process can be made simple.

The aircraft is driven along the roadway by its own engines or drawn by a tractor or by the roadway being provided with such an inclination that the aircraft will run along the roadway by its own weight, whereby the engines need not be in operation.

It is also possible to design the system so that the aircraft is stationary, while the portal is displaceable along the aircraft (e.g., on rails).

A plurality of position sensors for the aircraft are provided along the roadway a-p in FIG. 2 such that the sensors may be aligned parallel with the longitudinal axis of the passing aircraft. The object thereof is to record how far the aircraft has reached on its way along the roadway and to provide a signal to open those valves which the aircraft has reached and to close those valves which the aircraft has passed. The position sensors may include pressure responsive mechanisms in the roadway or photoelectric cells, which react, when the aircraft interrupts a light beam transversally of the roadway or metal detectors embedded into the roadway, e.g., of the type consisting of a coil, supplied with a high-frequency A.C. When a metal object, e.g. an aircraft wheel, appears sufficiently close to the coil, the inductance thereof will change. The position sensing may also be performed by means of a range finder, located in the extension of the roadway in a direction forwards or backwards. Each range finder controls the actuating current to relays, which open and close the valves 31–49 to the nozzles in the conduit. When the nose of the aircraft 10 has arrived in under the portal, the first range finder is triggered, which closes the actuating current to the relays that open the valves being directed towards the nose of the aircraft, whereby the treatment liquid is sprayed onto the nose of the aircraft. As the aircraft passes in under the portal, the position sensors are triggered one by one and the spraying from the various nozzles is started and interrupted, as the aircraft surfaces pass by the nozzles. For a conventionally designed aircraft the central nozzles will be open and spraying all the time from the moment the nose tip arrives in under the portal until the most rearward tail tip has passed under the portal. The most external nozzles spraying the wing tips, on the other hand, will be open only from the moment the front edges of the wing tips pass the nozzles until the rear edges of the wing tips pass the nozzles.

Which valves are to be opened or closed, when a certain position sensor is triggered, is determined by e.g. an electronic printed circuit card or the like, which is adapted to the type of aircraft to be treated. The printed circuit cards are made replaceable so that different types of aircraft can be treated.

FIG. 3 shows in a section of a circuit diagram how the position sensors, g,h, and i actuate the valves 31, 32, 33 and 34 through the relays g31′, g32′, g33′, g34′, h31′, h32′, h33′, h34′, i31′, i32′, i33′ and i34′.

The nose wheel of the aircraft triggers the position sensor h, such that the control circuit is closed and the actuating current passes from the current source 20 through the relays h34′, h33′ and h32′. Fine lines in FIG. 3 indicate leads for the actuating current, and thick lines symbolize the operating current. The relays h32′, h33′ and h34′ then close the operating current from the source 22 of operating current to the valves 32, 33 and 34, which are opened so that the treatment liquid is sprayed through the nozzles.

In the next moment the aircraft will leave the position sensor h, such that the control circuit is opened and the relays h32′, h33′, and h34′ will then be without current and break the operating current to the valves 32, 33 and 34, which will thus stop the spraying of liquid through the corresponding nozzles. As the aircraft leaves the position sensor h, however, it will trigger the position sensor i, which, according to the circuit diagram, will open the valves 31 and 32 via the relays i31′ and i32′.

The leads for the actuating current are assembled on a printed circuit card A and by means of contact members connected to the position sensors i,h,g, the current source 20 and the relays i31′-34′, h31′-34′, g31′-34′ in a pattern adapted to the type or aircraft to be treated.

FIG. 2 shows the general design of the printed circuit card for a Boeing Model 747-200 with a span of 59.64 m and a length of 70.66 m. A McDonnell-Douglas DC-9-21 has a span of 28.45 m. The wing tips thereof will reach just outside the inner engines of a B-747, and therefore a printed circuit card for a DC-9-21 would not on any occasion switch on the valves 31, 32, 33, 47, 48 and 49, since they are located outside of the wing tips. When side wind exists the condition may be changed by the wind compensator, see the description thereof. A DC-9-21 is 31.85 m long, and therefore all spraying of liquid is terminated, when the nose wheel actuates the position sensor i, since the aircraft is then completely past the portal. When tail wind or headwind exists, however, the wind compensator may compensate for this condition.

The wind may cause a drift of the liquid, which has a long distance to pass between the nozzle and the aircraft. In order to secure a favourable result of the treatment, a plurality of printed circuit cards may be formed for each type of aircraft, which are modified so as to compensate for different wind directions and wind forces. If the distance between the position sensors is 1 m and so strong a wind is blowing straight from behind that the drift of the jet of liquid will be 1 m, a printed circuit card is used, which is modified in such a manner that those valves that should have been opened and closed by a certain position sensor are actuated first by the next position sensor. Measuring instruments for wind force and wind direction are used for controlling the selection of printed circuit cards.

In the most primitive embodiment this is performed by the person operating the de-icing plant reading the wind force and wind direction and selecting a printed circuit card for the type of aircraft, adapted to the wind conditions. In a more automatized embodiment one set of printed circuit cards is provided for each type of aircraft, each individual card being adapted to a certain wind direction as well as to a certain wind force. Wind direction indicators and anemometers connect that particular printed circuit card of the set which is adapted to the existing wind conditions. Such an arrangement would be capable of reacting to rapid variations of wind direction and wind force. The structural design of such a wind compensator is exemplified in FIG. 4.

Figure 4:
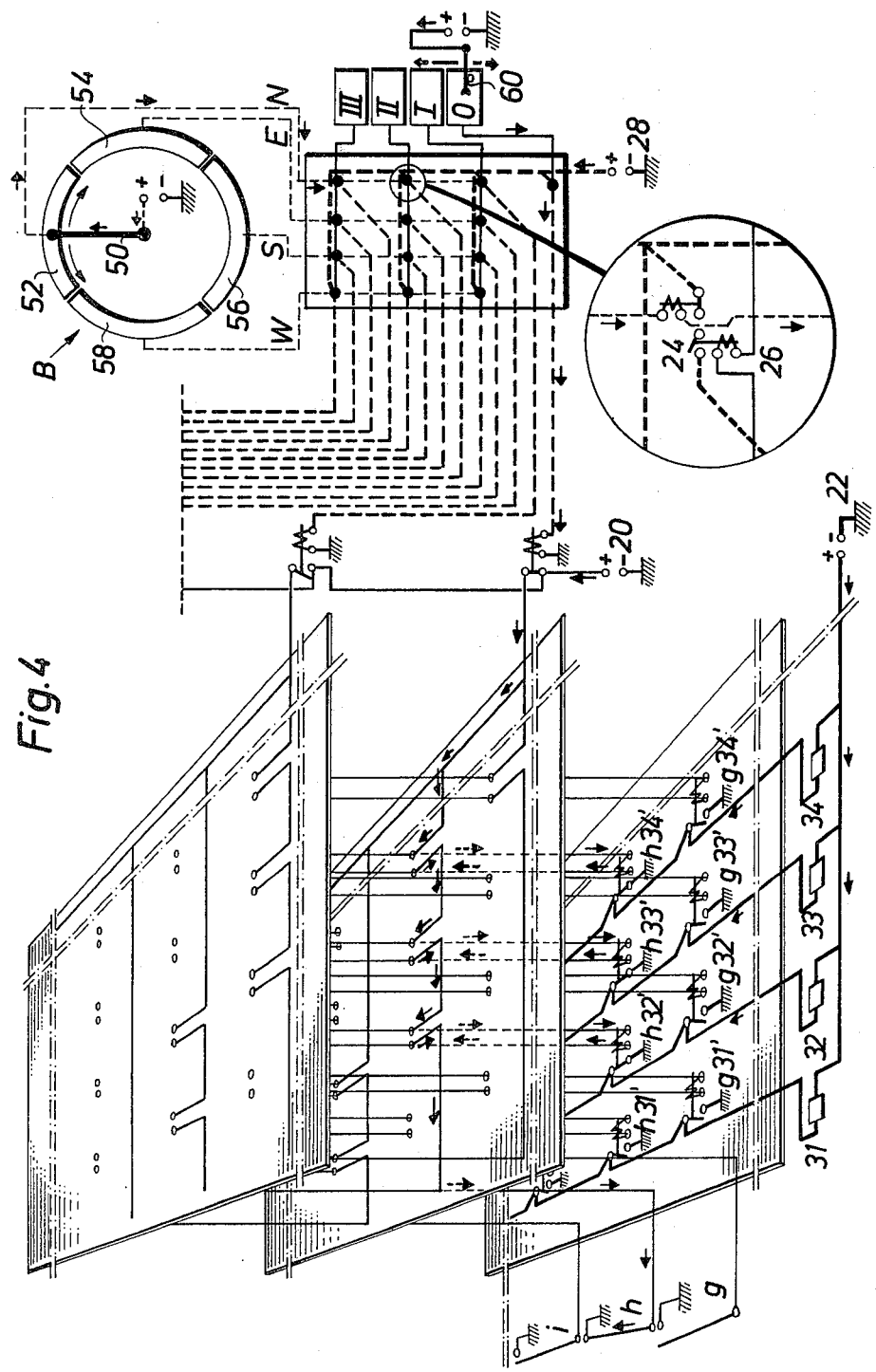

On the right hand side of FIG. 4 a wind compensator is shown, which includes a wind direction indicator B and an anemometer C and a plate D supporting relays. One the left hand side of the figure there are shown two printed circuit cards, O and N1, of totally thirteen printed circuit cards required in this example and the relay plate A with the relays h31', h32', h33', g31', g32', g33' and g34'. To the far left the position sensors g,h, and i are shown. At the bottom of the illustration the valves 31, 32, 33 and 34 are shown.

The wind direction indicator B includes a centrally pivoted, rotatable contact arm 50 and a vane or the like (not shown), which turns the contact arm a convenient number of contact plates 52, 54, 56, 58, one for each wind direction. In the FIG. 4 the use of four wind directions is shown, N,E,S and W but it is understood that more or fewer may be used. Via the contact arm an actuating current (fine, broken line) is supplied to one of the four contact plates and therefrom to the relay plate D.

The anemometer C includes a movable contact arm 60, a centrifugal regulator or the like (not shown), which moves the contact arm from one end position when no wind to the other end position at maximum wind force, and a suitable number of intermediate contact plates, one for each wind force interval. In the embodiment illustrated four wind force intervals are used, 0 for no wind and III for maximum wind force, with the intermediate positions I and II, but more or fewer intervals can be used. Via the contact arm an actuating current (fine, continuous line) is supplied to one of the contact plates and from there to the relay supporting plate D.

On the relay supporting plate D the two control currents from the wind direction indicator B and the anemometer C are combined at a number of connecting points. If all wind directions should be combined with all wind forces, 4×4=16 connecting points would be required, but since the wind direction is unimportant at the wind force=0, only thirteen connecting points are required in the example, viz.:

WIII, SIII, EIII, NIII,
WII, SII, EII, NII,
WI, SI, EI, NI,
and 0.

In each connecting point two series connected relays 24, 26 are provided. One relay 24 is actuated by the control current from the wind direction indicator B and the second 26 by the anemometer C. In order to allow the operating current (thick, broken line) from the operating current source 28 to pass through the connecting point in question it is necessary that both relays are closed. In a cut out section in the illustration of the contact point NII it is shown that the control current from the sector N of the wind direction indicator has closed one 24 of the two relays, while the second relay 26 breaks the operating current, since the anemometer is not in position II but in position 0.

Each connecting or contact point (i.e. WIII, SIII, EIII, . . . NI and 0) on the relay supporting or contact plate D is connected to one particular printed circuit card. There are thus thirteen printed circuit cards in the set but only the cards 0 and NI are shown in the illustration. The remaining eleven have been omitted for the sake of clarity.

In FIG. 4 it is shown by means of small arrows how the system is working. The wind direction indicator B points towards N and control current is supplied to the contact points NIII, NII and NI. The anemometer C, however, indicates 0, whereby the deffection of the wind direction indicator is unimportant. Via the contact point 0 the printed circuit card 0 is connected. Since the position sensor h is triggered, the control current will pass through the relays h34', h33' and h32', which will open the valves 34, 33 and 32.

Figure 2:
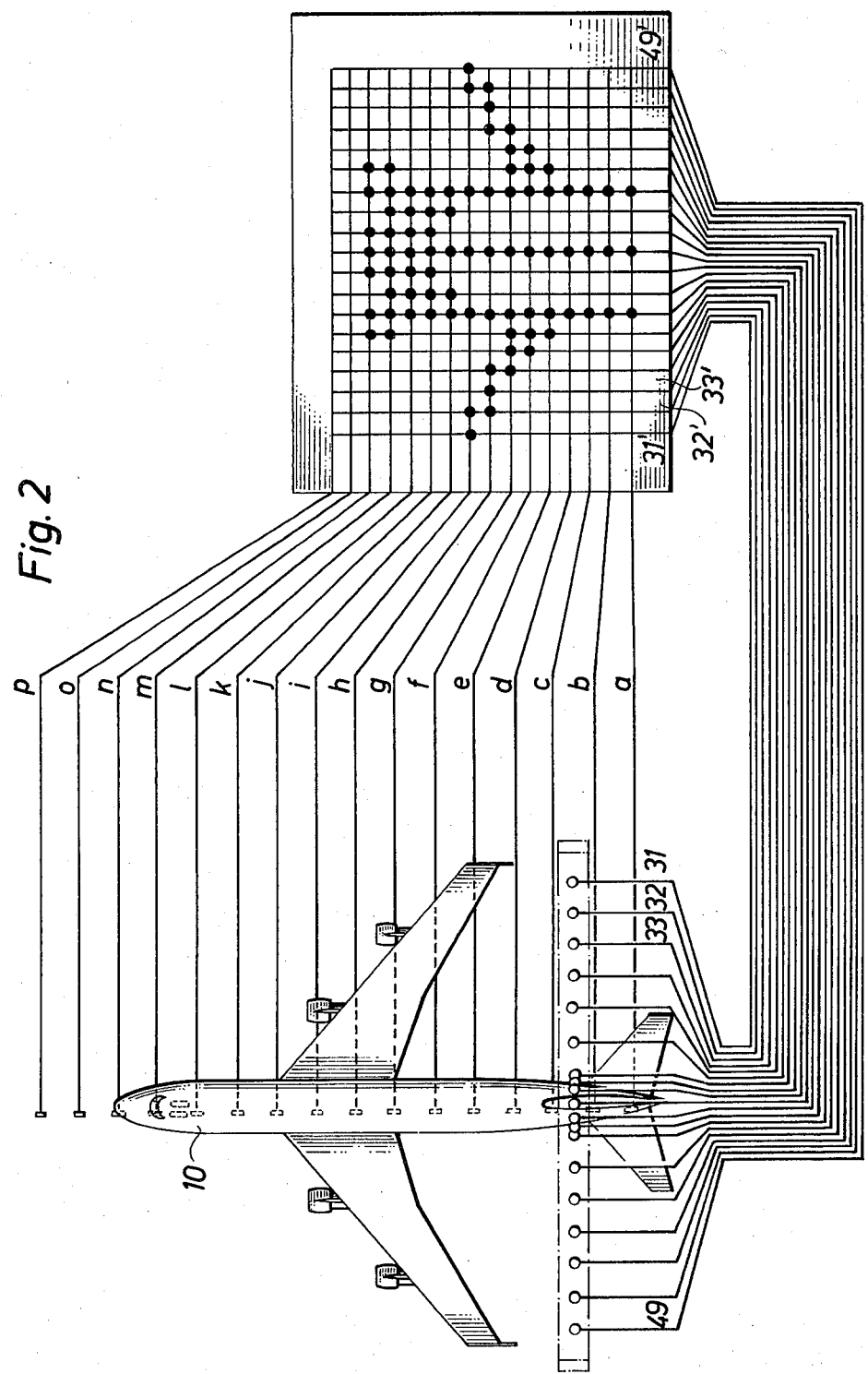
FIG. 2, illustrating a principal sketch of a programming assembly in the system according to the invention, FIG. 3, which shows a circuit diagram of a part of the programming assembly, and FIG. 4 a principal diagram of a wind compensator in the system according to the invention.
Figure 3:
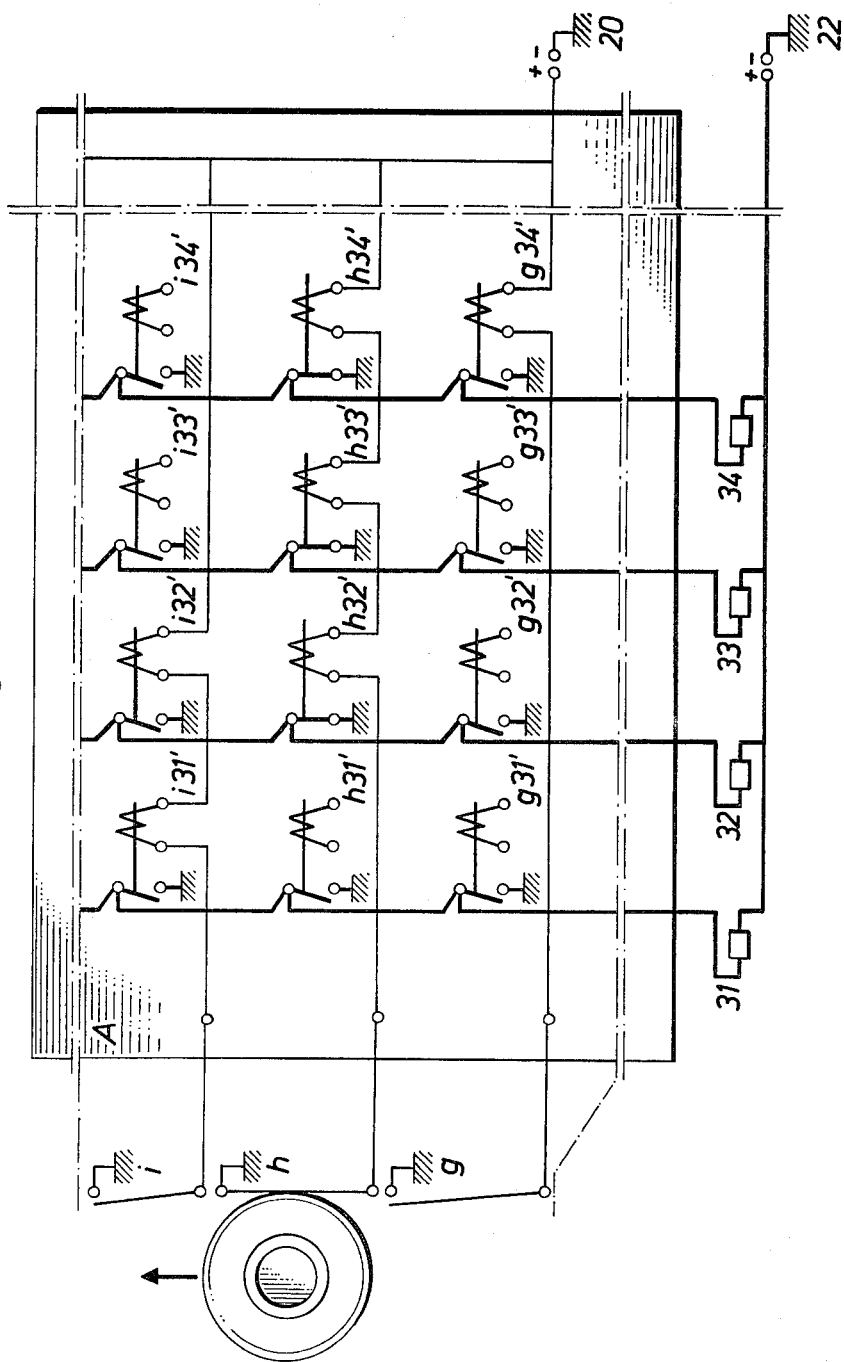

If a blast of wind should move the contact arm 60 of the anemometer C into position I, the two series connected relays 24, 26 in the contact point NI would close, the printed circuit card NI being connected. According to the printed circuit card NI the two valves 31 and 32 are connected, when the position sensor is in the position h. The two farthest nozzles 31 (and 49) in the portal, see FIG. 2, are thus spraying treatment liquid, in spite of the wing tips having still not arrived under the nozzles. However, the blast of wind drives the jet of liquid in the direction S (it is presumed that the aircraft is moving in the direction N), whereby the jet of liquid will hit the wing tip, before it has arrived in under the portal 1.

The movement of the aircraft 10 relative the portal 1 can also cause to start and stop the spraying by means of a plurality of sensors, which actuate the valves to the nozzles directly without the assistance of any programming assembly. A system operating in this manner can be designed so that a number of light sources are placed in the jet direction of the nozzles, preferably in the ground but other locations may also be used. The light sources are formed and directed so that they emit a narrow light beam towards a photo-electric cell placed adjacent each nozzle. The photo-electric cell controls the electrically operated valve belonging to the nozzle. As long as the light beam between the light source and the photo-electric cell is unbroken, the valve is kept closed by the photo-electric cell. When an object breaks the light beam, the photo-electric cell reacts and opens the valve to the nozzle, such that the de-icing liquid is sprayed onto the object. When the object has passed the light source and the nozzle, the light beam will again illuminate the photo-electric cell, which will then cause the valve to be closed and the spraying to be terminated. The photo-electric cell assembly used may also be of the type having a light source and a photoelectric cell mounted adjacent each other, wherein the photoelectric cell reacts to light which has been radiated from the light source and has been reflected from an object in front of the light source.

In addition to light, sound can also be used for sensing the position of the aircraft. A device of this kind is preferably formed so that the sound source and the sound receiver are located in line with the jet direction of the nozzle, one beyond that part of the room in which the aircraft will move and the other adjacent the nozzle. As long as the sound can pass unimpededly between the sound source and the sound receiver, the valve to the nozzle is kept closed but when an object arrives in front of the nozzle and thus deteriorates the sound transmission, the valve will be opened and the spraying of treatment liquid starts.

This way of controlling the treatment without using programming assemblies enables the treatment of any type of aircraft without any preparation, such as, e.g. production of printed circuit cards or selection of printed circuit cards. The advantage resides in the fact that the system does not need to be supervised by any person but can be made completely automatic, that the cost of programming assembly is avoided and that all types of aircrafts (and all other objects) can be treated without any preliminaries. The treatment liquid will in this system reach all parts of an aircraft located in front of a nozzle, even those parts which it is possibly desirable to avoid treating, e.g., windows and air inlets. This disadvantage may be of minor importance, if a liquid is used, which is harmless to those parts of the aircraft, e.g. hot water. If other liquids are used, the disadvantages can be eliminated by directing no nozzle towards the region in which e.g., the windows of the aircraft will pass.

Above it was indicated that one or more liquids are to be used as de-icing medium. However, under certain conditions gases may be used with advantage, such as, e.g., water steam or glycol steam. The advantages of using steam instead of liquid is that the heat energy content per unit weight is higher in steam. Thus, the required quantity of energy for melting snow and ice can be transferred to the aircraft with a smaller weight of de-icing medium. The drainage installations can be designed with smaller dimensions or possibly be completely eliminated. The jet of steam has also more heat energy in relation to its kinetic energy than a jet of liquid. If too much kinetic energy is transferred to the aircraft, mechanical damage will occur in the form of buckles in the sheet metal. By using jets of steam the risk of mechanical damage of the aircraft is thus reduced. As an alternative it is possible, with the same risk of damage, to allow the aircraft to pass more rapidly through the portal and still receive the necessary amount of heat energy.

In addition to liquid and steam it is also possible to use radiation energy for de-icing, e.g., light within or beyond the range of wave-lengths which are perceptible to the human eye. The use of radiation energy will eliminate the risk of mechanical damage of the aircraft. No arrangements are required for collecting and treating de-icing liquid or condensed de-icing steam. Only melted snow or ice may need to be removed. Energy losses to the atmosphere are reduced to a minimum.

As a source of radiation there may be used e.g. a heating lamp, a so called infrared radiator, laser or microwave generator or the type used in microwave ovens. The radiation can be controlled by means of position sensors and with or without a programming assembly in the same manner as described above for the spraying with liquid or steam.

The description has so far only treated arrangements for the removal of snow and ice from aircraft. However, there is a further type of coating on the surfaces of aircrafts which constitutes an inconvenience, namely dirt. Dirt in the form of dust, soot, crushed insects, excrement of birds, etc. is deposited on all surfaces of the aircraft, both during flight and when the aircraft is standing on the ground. This process of soiling generally proceeds rather slowly and, therefor, constitutes no risk for the safety in flight. However, the dirt impairs the surface smoothness of the aircraft and increases the air drag and the fuel consumption. Regarding the commercial air traffic, in addition dirt makes the aircraft look uglier, counteracting the impression of perfection which every air line company is seeking.

Before the accumulation of dirt has become too serious, the aircraft is therefor cleaned. This is usually performed by manual brushing the aircraft with cleaning devices and the aircraft is rinsed with clean water afterwards. The staff doing the job uses movable stairs and other scaffoldings in order to reach all parts of the planes. These scaffoldings must be moved frequently, which together with the primitive cleaning methods cause the process to be both time consuming and costly.

The arrangements described above for ejecting de-icing liquids can also be used for ejecting cleaning liquids. It is preferable to first have the aircraft sprayed in a first portal with a suitable cleaning liquid, which dissolves the dirt, and in the next portal the aircraft is then rinsed with clean water.

The liquid is transferred to the aircraft by a jet. The kinetic energy of the jet of liquid provides a processing of the layer of dirt or ice. This processing is intensified by having the jet of liquid pulsate or oscillate and by vibrating the layer of dirt or ice by exposing it to sound of proper frequency. The frequency of the sound is varied cyclicly for the purpose of effectively affecting the layers or coatings with different natural vibration frequencies. The sound is transmitted to the aircraft through the liquid column which is formed through the air by the jet. The sound producing means are mounted adjacent the nozzles on the conduit for the liquid in the portal.

In comparison with the manual method described above, the cleaning in the system according to the present invention can be expected to be somewhat less efficient, since the mechanical treatment of the dirt layer with a brush is eliminated. However, since the method will only require a fraction of the time necessary for the manual method, it is possible to repeat the cleaning much more frequently at the same cost and thereby attain an equal total effect or in any case extend the intervals between necessary manual cleanings.

Roadway or driving path, portals, position sensors, programming assemblies, pumps, valves, nozzles, supply conduits and drainage ducts may be common for de-icing and cleaning liquids, while it might be preferable to provide separate collecting tanks, treatment tanks and storage tanks for each kind of liquid used. A system arranged in this manner can be used alternatingly for cleaning and de-icing of aircraft.

By utilizing the system in this manner for two separate purposes the economy thereof will be improved.

The system according to the invention has been described above as adapted for de-icing and cleaning of aircrafts. However, the principles of the operation of the system can be used in any system which objects are to be exposed to spraying or radiation. Systems according to the invention can thus be designed for automatic surface treatment of objects in a sequence by e.g., sandblasting, zinc spraying, ground coating, finishing lacquering and drying with heat radiation. De-icing systems may be located at strategic points along a railway network for automatic operation when required for melting away snow and ice accumulated on the bogies of the trains and threatening to cause interruptions of the service.

We claim:

1. An apparatus for de-icing and cleaning aircraft comprising:
   first and second stationary stations for accommodating the sequential passage of said aircraft from said first station to said second station, and for application for first and second discrete treatments, respectively, to said aircraft;
   means disposed within said stationary stations for spraying said aircraft with liquid;
   means for supporting said spraying means which comprises a corridor having an opening substantially similar to a frontal profile of said aircraft for allowing the passage of said aircraft through said stations;
   said support means comprising conduits connected to said spraying means and forming a rigid frame in the form of a substantially closed loop defining said corridor;
   wherein a lower part of said frame in at least one of said first and second stationary stations is disposed beneath the roadway on which the aircraft is moving through the station for encompassing all the exterior surface portions of said aircraft such that said spraying means treats substantially all said exterior surface portions of said aircraft;
   first and second separate drainage systems operatively associated with said first and second stationary stations, respectively for separately collecting said liquid;
   one or more means provided along the movement path of the aircraft for sensing the position and motion at any moment of said aircraft relative to said stations; and
   means for automatically controlling said spraying means in response to said sensing means.

2. The apparatus of claim 1 wherein said spraying means further comprises
   a plurality of spraying members connected to said conduits; and
   a plurality of valves connected with said conduits and said spraying members.

3. The apparatus of claim 1 further comprising:
   means for spraying gas on said aircraft operatively connected with said controlling means.

4. The apparatus of claim 1 further comprising:
   nozzles adapted for spraying steam on said aircraft operatively associated with said controlling means.

5. The apparatus of claims 1 or 2 wherein said rigid frame further comprises a vertically adjustable rigid frame.

6. The appartus of claims 1, 2 or 3 wherein said sensing means are operatively associated with said spraying means so as to directly control said spraying means by effecting selective controllable spraying of said aircraft.

7. The apparatus of claims 1, 2 or 3 further comprising programming means operatively associated with and controlled by said sensing means and operatively associated with said spraying means to control said spraying means to effect selective controllable spraying through said spraying means.

8. The apparatus of claims 1, 2 or 3 further comprising means for sensing wind velocity and wind direction, said wind sensing means being operatively associated with said spraying means such that said wind sensing means partially controls said spraying means.

9. The apparatus of claim 1 further comprising means interconnecting said stations wherein said drainage systems are disposed beneath said interconnecting means.

10. The apparatus of claim 1 wherein said spraying means are rigidly disposed within said stationary stations.

11. The apparatus of claim 10 wherein said supporting means are rigidly disposed within said stationary stations.

12. The apparatus of claim 1 wherein a portion of said spraying means are disposed within a lower surface portion of said corridor such that substantially all lower exterior surfaces of said aircraft are encompassed by said spraying means.

13. The apparatus of claim 1, wherein said spraying means in said first stationary station further comprises means for spraying a heat carrying medium and said spraying means in said second stationary station further comprises means for spraying a freezing point depressant to prevent the freezing of any liquid remaining on said aircraft.

14. The apparatus of claim 1, wherein said spraying means in said first stationary station further comprises means for spraying on said aircraft a dirt-dissolving detergent and said spraying means in the second stationary station further comprises means for spraying a liquid for rinsing said detergent from said aircraft.

* * * * *

UNITED STATES PATENT AND TRADEMARK OFFICE
CERTIFICATE OF CORRECTION

PATENT NO. : 4,378,755
DATED : April 5, 1983
INVENTOR(S) : Ulla M. Magnusson et al It is certified that error appears in the above-identified patent and that said Letters Patent is hereby corrected as shown below:

On the title page Foreign Application Priority data should read

-- December 1, 1977 (SE) Sweden........7713619 --

Signed and Sealed this

Eighth Day of November 1983

[SEAL]

Attest:

GERALD J. MOSSINGHOFF

Attesting Officer

Commissioner of Patents and Trademarks